US009998557B2

(12) United States Patent
Heller et al.

(10) Patent No.: US 9,998,557 B2
(45) Date of Patent: Jun. 12, 2018

(54) SYSTEMS AND METHODS FOR IDENTIFYING AND CHARACTERIZING CLIENT DEVICES

(71) Applicant: Akamai Technologies, Inc., Cambridge, MA (US)

(72) Inventors: Alec Heller, Somerville, MA (US); David H. Kaufman, Lexington, MA (US); Eric L. Kobrin, Dania Beach, FL (US); Stephen R. Scaffidi, Watertown, MA (US); Walter P. Tetzner, Shirley, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days. days.

(21) Appl. No.: 15/586,360

(22) Filed: May 4, 2017

(65) Prior Publication Data
US 2017/0302752 A1    Oct. 19, 2017

Related U.S. Application Data

(63) Continuation of application No. 15/210,357, filed on Jul. 14, 2016, now Pat. No. 9,692,830, which is a (Continued)

(51) Int. Cl.
*G06F 15/16* (2006.01)
*H04L 29/08* (2006.01)
(Continued)

(52) U.S. Cl.
CPC .... *H04L 67/2823* (2013.01); *G06F 17/30528* (2013.01); *H04L 63/0876* (2013.01);
(Continued)

(58) Field of Classification Search
CPC ... H04L 63/0876; H04L 67/04; H04L 67/303; H04L 67/42; H04L 67/02
(Continued)

(56) References Cited

U.S. PATENT DOCUMENTS

| 9,419,852 B1 | 8/2016 | Heller | |
|---|---|---|---|
| 2010/0057843 A1* | 3/2010 | Landsman | H04L 63/0407 709/203 |
| 2010/0107225 A1* | 4/2010 | Spencer | H04L 63/0876 726/4 |

OTHER PUBLICATIONS

U.S. Appl. No. 15/210,357.
(Continued)

*Primary Examiner* — Chris Parry
*Assistant Examiner* — Weiwei Stiltner

(57) ABSTRACT

The teachings herein generally relate to client-server communications and the delivery of content over computer networks to clients, and provide improved methods, systems, and apparatus for identifying and/or characterizing client devices that are requesting content from a server. For example, based on information sent in a client device's request for content, a web server modified in accordance with the teachings hereof can identify a set of characteristics associated with that client device. Such characteristics might include the model name of the client device, the screen dimensions of the client device, information about the particular operating system or browser name/version it is running, content formats it is capable of consuming, and so on. The web server can use this information to modify and customize its response for the given client device.

15 Claims, 11 Drawing Sheets

Related U.S. Application Data continuation of application No. 13/730,428, filed on Dec. 28, 2012, now Pat. No. 9,419,852.

(60) Provisional application No. 61/595,982, filed on Feb. 7, 2012, provisional application No. 61/581,738, filed on Dec. 30, 2011.

(51) Int. Cl.
*H04L 29/06* (2006.01)
*G06F 17/30* (2006.01)

(52) U.S. Cl.
CPC .............. *H04L 67/02* (2013.01); *H04L 67/04* (2013.01); *H04L 67/303* (2013.01); *H04L 67/42* (2013.01)

(58) Field of Classification Search
USPC ........................................................ 709/227
See application file for complete search history.

(56) References Cited

OTHER PUBLICATIONS

U.S. Appl. No. 13/730,428.
Applicant's letter titled "Communication Under MPEP § 609.02", 2, pages, filed with this SB/08 (dated May 4, 2017).

* cited by examiner

Exemplary Devices 1,2,3:

1. Mozilla/5.0 (Macintosh; Intel Mac OS X 10_5_8) Safari/533.19.4

2. Mozilla/5.0 (Windows; Windows NT 6.1) Safari/534.13

3. Mozilla/5.0 (Windows; Windows NT 5.1) Safari/534.13

SYSTEMS AND METHODS FOR IDENTIFYING AND CHARACTERIZING CLIENT DEVICES

CROSS-REFERENCE TO RELATED APPLICATIONS

This application is a continuation of U.S. application Ser. No. 15/210,357, filed Jul. 14, 2016, which is a continuation of U.S. application Ser. No. 13/730,428, filed Dec. 28, 2012 (now U.S. Pat. No. 9,419,852), which claims the benefit of priority of U.S. Provisional Application No. 61/581,738, filed Dec. 30, 2011, and of U.S. Provisional Application No. 61/595,982, filed Feb. 7, 2012, the teachings of all of which are hereby incorporated by reference in their entireties.

BACKGROUND

Technical Field

This application generally relates to client-server communications and the delivery of content over computer networks, and more particularly to the identification and/or characterization of client devices that are requesting content over computer networks.

Brief Description of the Related Art

The client-server model for obtaining content over a computer network is well-known in the art. In a typical system, such as that shown in FIG. 1A, a content provider manages or otherwise arranges for a server that hosts particular content (e.g., website content). A client device makes a request for a given piece of content (e.g., an html document defining a page on the web site) over a computer network. The server can respond to the client device by sending the requested content.

It also known in the art to use distributed computer systems to deliver content to client devices. One such distributed computer system is a "content delivery network" or "CDN" that is operated and managed by a service provider. The service provider typically provides the content delivery service on behalf of third party content providers. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" refers to the storage, caching, or transmission of content—such as web pages, streaming media and applications—on behalf of content providers, and ancillary technologies used therewith including, without limitation, DNS query handling, provisioning, data monitoring and reporting, content targeting, personalization, and business intelligence.

In a known system such as that shown in FIG. 1B, a distributed computer system 100 is configured as a content delivery network (CDN) and has a set of machines 102 distributed around the Internet. Typically, most of the machines are servers located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML, embedded page objects, streaming media, software downloads, and the like) to the distributed computer system 100 and, in particular, to the servers (which are sometimes referred to as content servers, or sometimes as "edge" servers in light of the possibility that they may be near an "edge" of the Internet, or sometimes as proxy servers if running a proxy application, as described in more detail below; none of these terms are mutually exclusive). Such servers may be grouped together into a point of presence (POP) 107.

Typically, content providers offload their content delivery by aliasing (e.g., by a DNS CNAME or otherwise) given content provider domains or sub-domains to domains that are managed by the service provider's authoritative domain name service. End user client machines 122 that desire such content may be directed to the distributed computer system to obtain that content more reliably and efficiently. The servers 102 respond to the client requests by obtaining requested content from a local cache, from another content server, from the origin server 106, or other source, for example.

Although not shown in detail in FIG. 1, the distributed computer system may also include other infrastructure, such as a distributed data collection system 108 that collects usage and other data from the content servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the content servers.

As illustrated in FIG. 2, a given machine 200 in the CDN (sometimes referred to as an "edge machine") comprises commodity hardware (e.g., a processor) 202 running an operating system kernel (such as Linux or variant) 204 that supports one or more applications 206. To facilitate content delivery services, for example, given machines typically run a set of applications, such as an HTTP proxy 207, a name server 208, a local monitoring process 210, a distributed data collection process 212, and the like. The HTTP proxy 207 (sometimes referred to herein as a global host or "ghost" process) typically includes a manager process for managing a cache and delivery of content from the machine. For streaming media, the machine typically includes one or more media servers, such as a Windows Media Server (WMS) or Flash server, as required by the supported media formats.

The machine shown in FIG. 2 may be configured to provide one or more extended content delivery features, preferably on a domain-specific, customer-specific basis, preferably using configuration files that are distributed to the content servers using a configuration system. A given configuration file preferably is XML-based and includes a set of content handling rules and directives that facilitate one or more advanced content handling features. The configuration file may be delivered to the CDN server via the data transport mechanism. U.S. Pat. Nos. 7,240,100 and 7,111,057, the teachings of which are incorporated herein by reference, illustrate a useful infrastructure for delivering and managing CDN server content control information and this and other content server control information (sometimes referred to as "metadata") can be provisioned by the CDN service provider itself, or (via an extranet or the like) the content provider customer who operates the origin server.

The CDN may include a storage subsystem (sometimes referred to as "NetStorage") which may be located in a network datacenter accessible to the content servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. For live streaming delivery, the CDN may include a live delivery subsystem, such as described in U.S. Pat. No. 7,296,082, and U.S. Publication No. 2011/0173345, the disclosures of which are incorporated herein by reference.

Whether content is delivered directly as in FIG. 1A or via the CDN in FIG. 1B, servers are being called upon to deliver content to an increasingly diverse array of client devices and environments. More and more, end-users consume content using devices other than the conventional desktop PC. Smartphones, tablets and other mobile devices, as well as televisions, conferencing systems, gaming systems, and other connected devices are being used more and more to consume online content.

The proliferation of client devices means that the display features, form factors, functional capabilities, and other characteristics thereof are becoming much more diverse. Online content providers want to be able to deliver content effectively and efficiently to this increasing array of clients in a way that is situationally-aware. To optimize the end user experience, a given server (in the CDN or otherwise) preferably is able to understand the capabilities, limitations, and other attributes of the client device that is requesting content from it. The server can then act appropriately for the particular device—for example, sending images appropriately sized for the client device's screen, or filtering content sent to the client so that incompatible content is not delivered to the client. Hence, there is a need for a server to be able discern information about a requesting client in a rapid fashion, accurately, at scale, and while accommodating a non-uniform and ever-expanding universe of new clients.

The teachings herein address these and other needs and offer other features and advantages that will become apparent in view of this disclosure.

SUMMARY

The teachings herein generally relate to client-server communications and the delivery of content over computer networks to client devices, and the teachings provide improved methods, systems, and apparatus for identifying and/or characterizing client devices that are requesting content from a server. For example, based on information sent in a client device's request for content, a server modified in accordance with the teachings hereof can derive and identify the client device and a set of characteristics associated with the client device. Such characteristics might include the model name/manufacturer of the client device, screen dimensions of the client device, information about the particular system or browser version it is running, content formats it supports, and so on. The server operating may then use this information to modify and customize its response for the given client device.

In one embodiment, as part of an offline configuration, each of a set of known client devices is initially associated with a set of tokens that are expected to be received in a request from a client device—typically tokens that would be present in the client device user-agent header in an HTTP 'Get' request (although other fields might be used with teachings hereof). A data structure mapping expected tokens to associated known client devices is established.

Continuing the example, when the system is live (online), a particular client device makes a request for content, and sends the user-agent header field. The server tokenizes this information, breaking it up into its individual constituents, such as "Windows" or "Safari." Based on a comparison between the tokens generated from the information received from the client device, and the expected tokens that were previously associated with known client devices, the server can determine which of the known client devices is sending that request. In effect, the server can select which of the known client devices has tokens that are most similar to those generated from the request, the matching set of tokens representing a kind of fingerprint for the device.

The process finding a matching device, given a set of tokens generated from a client device's request, may be accomplished in a variety of ways. For example, the server can use a scoring approach by taking a particular generated token, using it look up those known client devices that had been associated with that token, and then increasing a score for each of those known client devices. This process is repeated for the other generated tokens, and at the end of the scoring, the known client device with the highest score can be selected as the matching client device. Note that tokens may have different weights, so that the appearance of a particular token may result in a larger increase in the matching known client devices' scores than does the appearance of others.

In an alternate embodiment, the server identifies the requesting client device as one of the known client devices by using the set of generated tokens to create a key. For example, the generated tokens may be aliased to integers or other identifiers, which are then combined to create the key. Or the tokens themselves may used (e.g., as strings, for example, which are concatenated). The server uses the constructed key to look up a device identifier in the data structure, e.g., which has been prepopulated so that the key points to a particular device identifier that corresponds to the matching client device. In alternate embodiments, some but not all of the tokens may be used in constructing the key. For example, certain tokens can be ignored, if they are low-value for identifying a client device. To accomplish this, the system may employ of whitelist of valid tokens, created offline during the initial configuration. Only tokens in the whitelist are used in constructing the key. This allows low-value or noise tokens, omitted from the whitelist, to be ignored during the matching process. Using a blacklist of invalid tokens is an alternate embodiment.

Once a requesting client device is identified as a particular known client device, the server can map that client device's identity to a set of client device characteristics. Such characteristics might include (for example) screen dimensions, model name, support for AJAX technologies, and other features that were not known based on the client device's request. The teachings hereof are applicable to (though not limited to) use with mobile devices such as wireless smartphones or Wifi-enabled tablets, and so forth. The characteristics of such devices vary widely and by knowing the characteristics of the client device, a server can customize a response for the particular client device, apply appropriate optimization techniques, or send the information to an origin server or elsewhere to be used for performing such customizations and optimizations. Ideally, the result is better display of the content on the client device, as well as improved performance, since the nature and size of the content can be adjusted based on an expected bandwidth to the client device and the capabilities that the client device possesses.

It should be understood that while the use of user-agent HTTP headers is one application, the teachings hereof and in particular the tokenization approach described herein are not limited to such. Likewise the server is in many cases an HTTP server, but is not limited to such. In some cases, the server may be an HTTP proxy server in a content delivery network operated by a service provider on behalf of participating content providers, and the identification of the client device and its characteristics may be offered as a service by the CDN for participating content providers. Hence, such information may be communicated from the content delivery platform to the content provider's own servers or other data infrastructure for use in, e.g., content authoring.

The foregoing merely refers to non-limiting embodiments of the subject matter disclosed herein and the appended claims define the subject matter for which protection is sought. The teachings hereof may be realized in a variety of systems, methods, apparatus, and non-transitory computer-readable media. It is also noted that the allocation of functions to particular machines described herein is not limiting, as the functions recited herein may be combined or split amongst machines in a variety of ways.

BRIEF DESCRIPTION OF THE DRAWINGS

The teachings herein will be more fully understood from the following detailed description taken in conjunction with the accompanying drawings, in which.

Figure 1A:
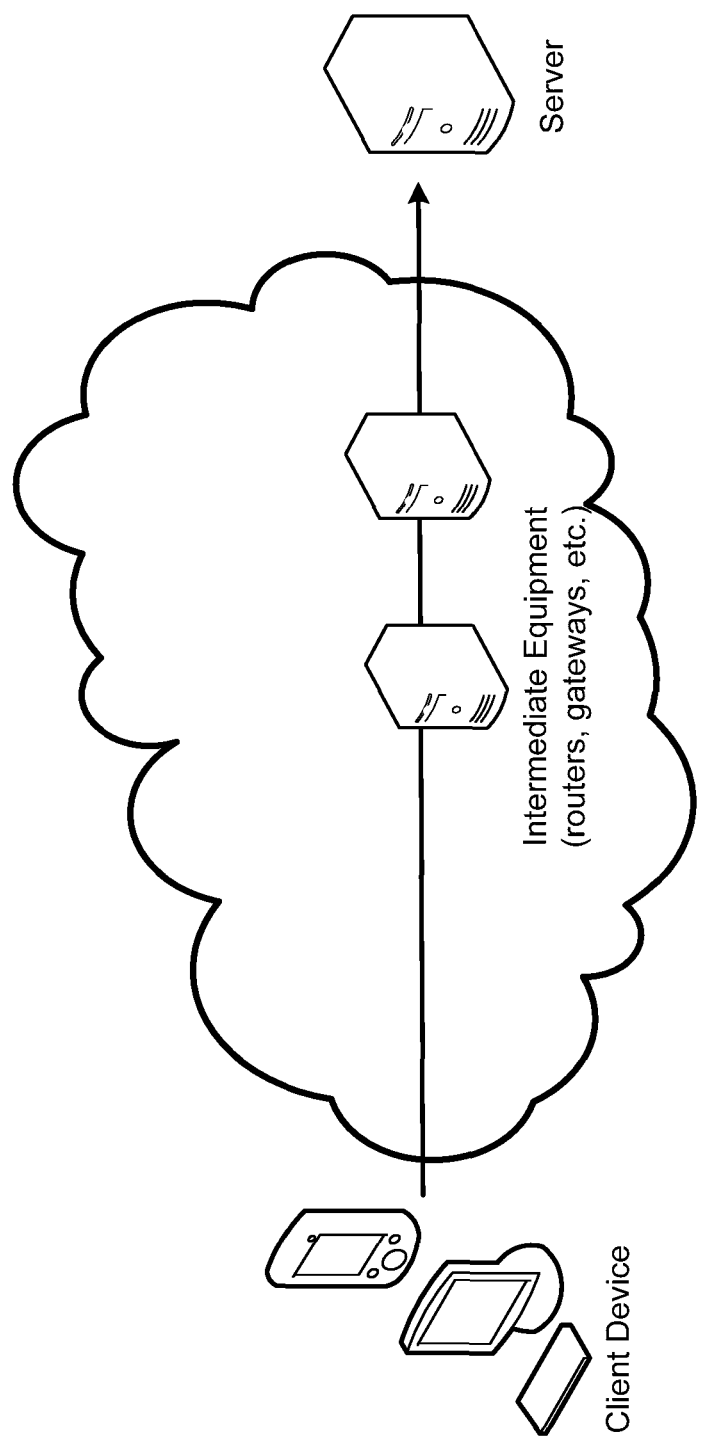
FIG. 1A is a schematic diagram illustrating an exemplary client-server model for retrieving content over a computer network such as the Internet.
Figure 1B:
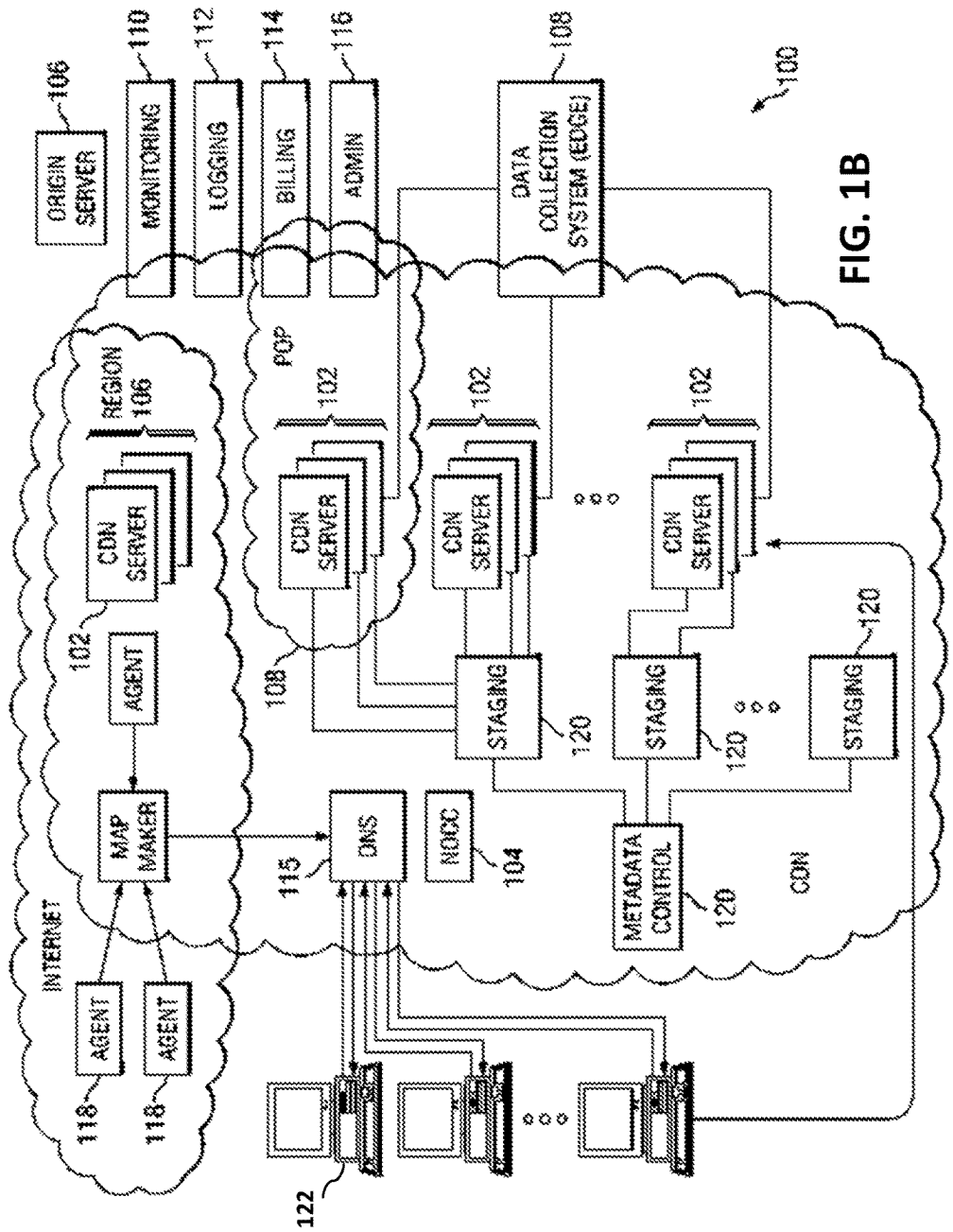
FIG. 1B is a schematic diagram illustrating one embodiment of a distributed computer system configured as a content delivery network.
Figure 2:
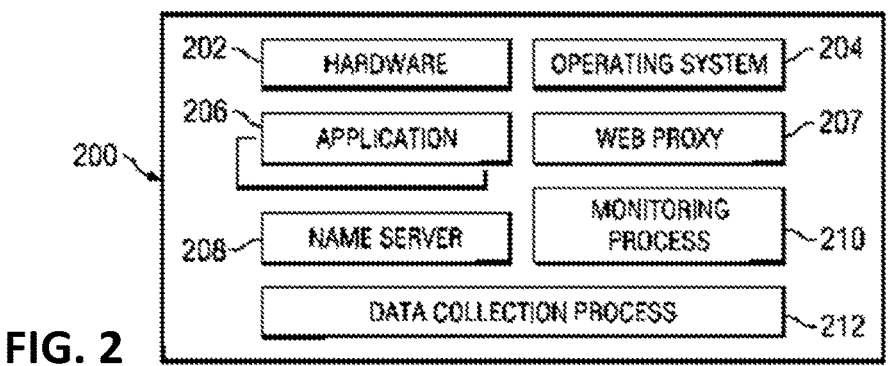
FIG. 2 is a schematic diagram illustrating one embodiment of a machine on which a server in the system of FIG. 1B can be implemented.

It should be noted that in the Figures, the integers representing internal identifiers (such as 37, 56, 118, 17, and 1, 2, 3, etc., in FIG. 7, and analogous integers in other Figures) are merely arbitrary numbers used for illustrative purposes only.

DETAILED DESCRIPTION

The following description sets forth embodiments of the invention to provide an overall understanding of the principles of the structure, function, manufacture, and use of the subject matter disclosed herein. The systems, methods and apparatus described herein and illustrated in the accompanying drawings are non-limiting examples; the scope of the invention is defined solely by the claims. The features described or illustrated in connection with one embodiment may be combined with the features of other embodiments; such modifications and variations are intended to be included within the scope of the present disclosure. All patents, publications and references cited herein are incorporated herein by reference in their entireties.

Section 1.0—Introduction

According to the teachings hereof, the functionality of a server can be extended by incorporating a component that identifies client devices that are making requests to the server, and potentially supplies a set of characteristics about the identified devices. For convenience of description (only), this component is referred to herein as the device characterization component (DC). Given a client request, the DC identifies the client device that made it, e.g., by mapping it to a particular client device identifier. It should be noted that identifying a client device does not necessarily mean identifying just the hardware (e.g., a particular model of laptop or of the smartphone) but also may involve the information about the software resident on the device—particularly the OS and browser or other client application. Thus, a particular make/model of laptop running Windows 7 and using Internet Explorer to make requests can qualify and be identified as a different client device than the same make/model of laptop running Windows XP and using Firefox. Likewise, not every existing client device needs to be identified uniquely, because in some cases devices with insignificant differences may be treated as effectively the same client device. From an identified device, the DC can also provide information about the device's characteristics (e.g., screen height/width, JavaScript support, browser version, or other characteristics relating to the client's hardware and/or software, etc.) to other components in the server.

Typically, the server with the DC component is a web (HTTP) server, or in implementations relevant to the CDN system described above, the server may be a server running the HTTP proxy 207 process (HTTP proxy server). For example, the DC may be implemented as an independent library which will be used by the HTTP process or HTTP proxy process 207 to identify client devices and determine client device characteristics. The determined characteristics are preferably exposed to control information (e.g., metadata) and control routines executing in the server, so that this information can be taken into account to construct a response suited for the client device. The identification and/or characterization of the devices also can be logged and reported to a content provider user of a CDN.

While the DC is preferably resident within a given server fielding client requests, this is not a limitation, as the DC function could be implemented, for example, as a remote service.

The DC typically utilizes information received in the client request, typically information in one or more HTTP headers, and (in particular) a user-agent header. The user-agent request header field in HTTP 1.1 is described in RFC 2616. However, the teachings hereof are not limited to user-agent headers; for example, the techniques may be applied to data in other HTTP headers or part of some other, potentially later-defined header or data field adapted to be used for client-identifying purposes, whether those headers/fields are received from a client device or otherwise made known to the server. Examples of other headers include the X-Device-Stock-UA, X-wap-profile, X-OperaMini-Phone-UA header, etc. For convenience of illustration, the examples below use the user-agent header.

Figure 3:
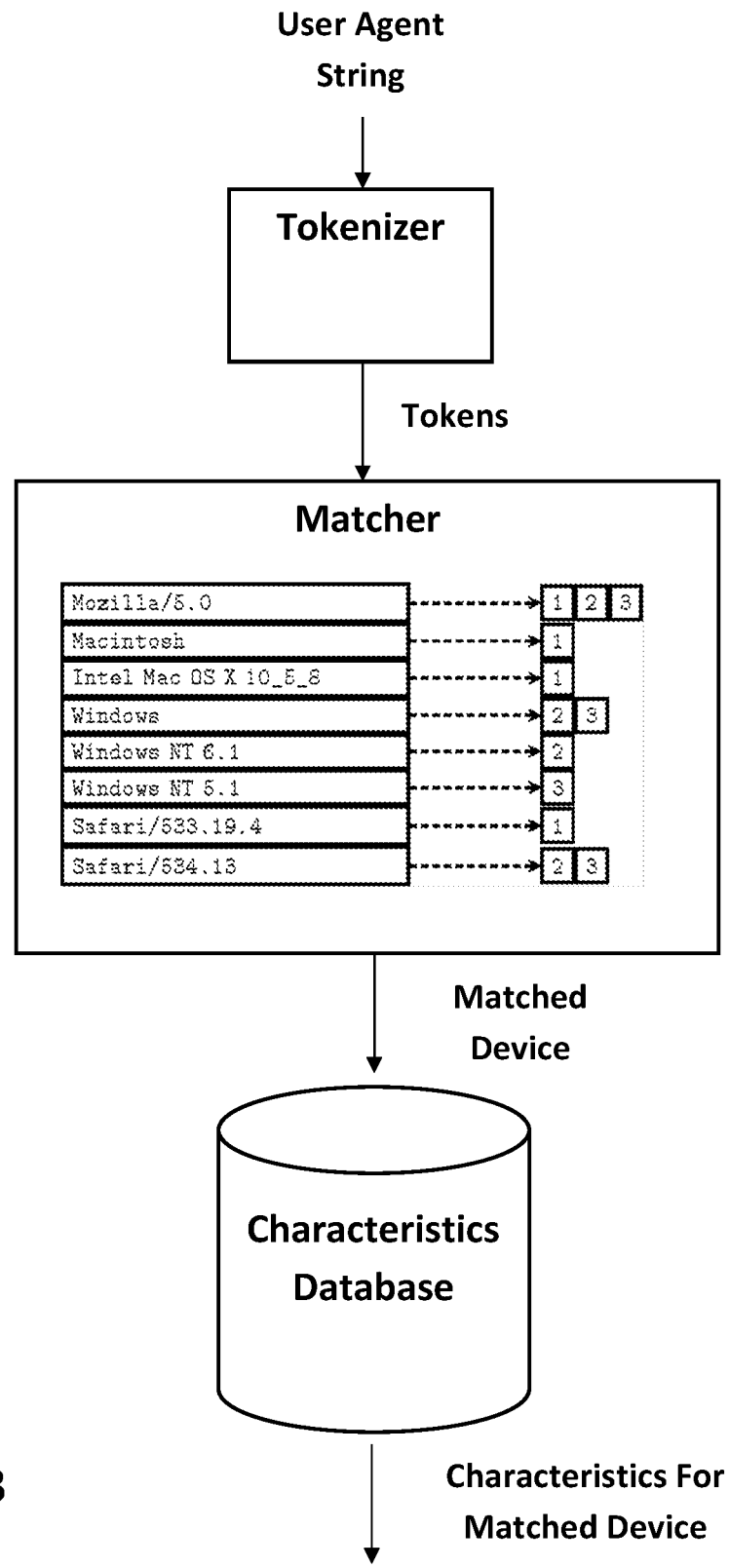
FIG. 3 is a schematic diagram illustrating one embodiment of a high level architecture for client device identification and characterization.

FIG. 3 illustrates one embodiment of a high-level architecture for the DC. In this embodiment, the DC has the following functional components:

A Lexer, which receives user agents from client requests and breaks up the user agents into meaningful chunks, called tokens.

A Matcher, which receives the tokens from the Lexer and is responsible for using them to identify particular devices. The Matcher employs a match index, described in more detail and in different variations below, to match a given token to a set of devices associated with it.

A Characteristics Database, which stores characteristics for each client device. Given a particular device identified by the Matcher, the characteristics database provides a set of characteristics for that device. These characteristics can then be used by the server to generate an appropriate response for the client device.

Preferably, the match index and the characteristics database can each be updated via configuration files without requiring changes to the DC core logic or to the glue code in the server. The configuration of the system will also be described herein, and involves use of some of the same components. For convenience of description, the configuration is referred to herein as an "offline" process, while actual operation when the server is receiving client requests and identifying/characterizing client devices is referred to as "runtime" or "online."

Before examining each of the components in more detail, presented below is a discussion of the data model for the DC.

Section 2.0—Data Model

Section 2.1—Match Index

Figure 4:
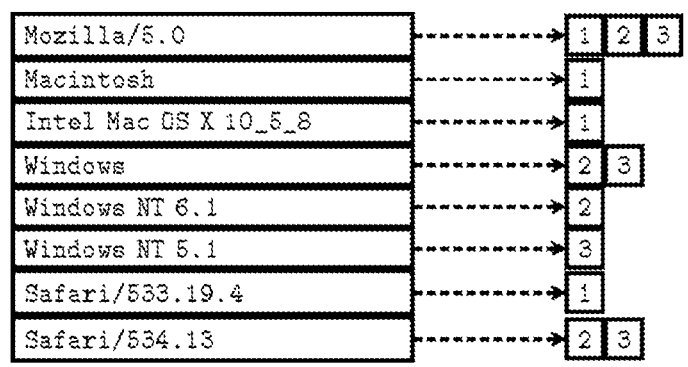
FIG. 4 is a schematic diagram illustrating one embodiment of a match index mapping tokens to client devices.

In the present embodiment, the DC library maintains a match index to identify devices. The match index maps tokens to known client devices, preferably in memory. An example of such an index for three devices is shown in FIG. 4. In the lower portion of FIG. 4, each of devices 1, 2, 3 is associated with particular user agent information. (In effect, the user agent information provides a definition of each particular device, and hence the tokens to expect for that device.) Each user agent string contains several constituent components, or tokens. These include operating system names like "Windows NT 5.1" or browser names/versions like "Mozilla/5.0" or "Safari/534.13", and other things. The match index, shown in the upper portion of FIG. 4, maps these tokens to the devices in which they appear. Hence, the token "Mozilla/5.0" appears in all three of the example client device user agents, while "Windows NT 5.1" appears in the user agent of client device 3 only. The index is preferably constructed offline (e.g., prior to the time of client requests) for performance reasons, and thus can be constructed externally to, and then communicated to, the server that will ultimately receive client requests before being transferred thereto.

As mentioned above, in alternate implementations, the match index and the DC system may utilize information other than, or in addition to, the user-agent header. For example, assume that the information for devices 1, 2, 3 in the lower part of FIG. 4 was received not as part of a user-agent header but extracted from some other HTTP header, or some other data field or message sent from the client device, or it was sent from some other entity or machine about the client device. The information could still be tokenized and used in the match index as shown in FIG. 4, as appropriate. The information itself might be different than the types of information seen in a typical user-agent header, but all of the techniques described herein would apply nonetheless.

Section 2.2—Device Characteristics

In the present embodiment, the Characteristics Database stores, and the DC makes available to other server components (e.g., to the HTTP process or the HTTP proxy process), a set of characteristics for client devices. The names and permissible values of these characteristics are preferably configurable. Some examples are provided in later paragraphs.

To facilitate reporting and logging, a device_name characteristic is provided. The device_name characteristic is a unique name (per client device) which can be used in server log lines for later data processing.

Figure 5:
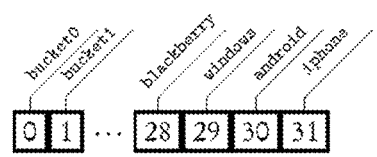
FIG. 5 is a schematic diagram illustrating a characteristic referred to herein as 'buckets', for use in logging and reporting.

Additionally, another characteristic referred to herein as "buckets", a 32-bit mask, is included. An example is shown in FIG. 5. This characteristic enables a given HTTP proxy server to reports counts (requests) to the logging/reporting system that are grouped by the bits set in buckets.

Client device characteristics might include such things as screen dimensions, JavaScript support, browser name and/or version, or other characteristics, relating to the device hardware and/or software running on the device. Other examples of the kinds of characteristics that may be made available about a particular identified client device include: operating system name and/or version, processor name and/or version, the form factor of the device (e.g., smartphone, tablet, laptop), model name or manufacturer, user interface details (e.g., touchscreen availability, trackball, audio features, etc.), release date, connectivity/protocol information (e.g., WiFi enabled, 3G-capable), information about how the device renders/displays markup languages like html, wml, xhtml, or others, what support the device offers for AJAX technologies (e.g., Javascript support, event listening support, CSS manipulation support), further screen information like display resolution and whether the display has dual orientation capability, support for content formats (including multimedia), how the device handles certain transactions such as authentication and HTTP post, information about the client device's cache, whether the device has a camera, or other hardware (processor, memory, etc.) features, whether particular software is installed, and so on. Virtually any characteristic about a client device that might be useful for a content developer designing a website or otherwise might be recognized by the DC system and then reported when the matching client device is seen by the system.

Section 3.0—DC Components

Section 3.1—Lexer

As noted above, DC treats user-agents as sequences of tokens rather than whole character strings. Tokenizing input may be accomplished using conventional approaches, as modified by the teachings hereof. In the present embodiment, scanning a user-agent to tokenize it occurs online when servicing requests. It also occurs offline when generating and building the match index. Hence, to make sure that user-agents are being tokenized uniformly during configuration (offline) and at runtime (online), the same lexing routines ought to be used in each process.

Figure 6:
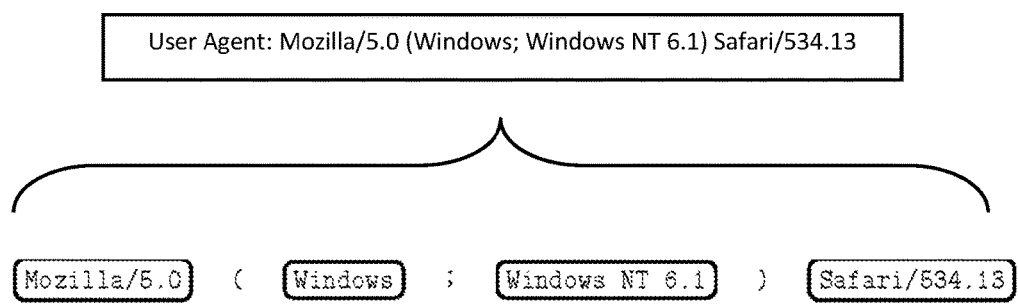
FIG. 6 is a schematic diagram illustrating an example of breaking up a given user-agent into tokens.

FIG. 6 illustrates an example of lexing user-agents into tokens. In this example, tokens are whitespace delimited, except when inside parentheses, when they are semicolon delimited. Note that in some implementations, it is advantageous for the tokenizing process to be somewhat squishy, for example by matching on a portion (e.g., a prefix) of a string rather than relying on an exact match. Thus, a set of tokens in user-agents such as "Firefox/16.0.1", "Firefox/16.0.2", and "Firefox/16.0.3", may all be recognized as token "Firefox/16." This technique reduces the number of tokens that the system must deal with and is useful where the subtle differences between, in this example, various versions of Firefox, are not considered to be relevant.

Section 3.2—Matcher

As described above in connection with FIG. 3, in one embodiment, the Lexer tokenizes a received user-agent and provides the generated tokens to the Matcher. As described above in connection with FIG. 4, the Matcher maintains a match index (preferably in-memory) mapping user-agent tokens to a set of client devices containing them. The Matcher determines which device to return for a given user-agent, or more particularly, for the given tokens in the user-agent. In one embodiment, the Matcher does this by scoring the devices.

For example, a score for a given client device can be calculated as the total of the tokens from the user-agent that map to that client device. (If the token appears in the user-agent but does not map to that client device, the token is not applied, i.e., it would be zero. In other embodiments, the token in such a scenario might be counted as a negative.) The client device identified for a given user-agent is that device having the highest score relative to other client devices.

Note that the weight of each token is not necessarily the same. For example, the Matcher can keep a weighting indicating how significant it considers a given token for identifying a client device with which it is associated. The more common a particular token (across devices), the less significant it might be considered to be for identifying a particular client device.

By way of illustration, consider the sample match index in FIG. 4, and suppose that the weight of a token is the reciprocal of the number of client devices containing it. That is, the weight for the token "Windows" is ½ (as devices 2 and 3 contain it) while the token "Mozilla/5.0" has a weight of ⅓, because all three of the sample client devices contain it. When the Matcher examines the user-agent in FIG. 6, it will pick the client device with the highest score, as shown in the table below. Here, device 2 has the highest score and is identified.

| Device | Mozilla/5.0 | Windows | Windows NT 6.1 | Safari/534.13 | Device Score |
|---|---|---|---|---|---|
| 1 | ⅓ | — | — | — | ⅓ |
| 2 | ⅓ | ½ | 1 | ½ | 2⅓ |
| 3 | ⅓ | ½ | — | ½ | 1⅓ |

As previously noted, a client device can be associated with information from not just the user-agent but other header or client information. In such a case, the user-agent can be scored and then combined with other information to determine the final matching device.

It is noted that in the example above, the weighting of tokens as the reciprocal of the number of user-agents containing it is provided for illustration purposes only; however, the approach described herein is not limited to any particular weighting mechanism.

Internal Data Flow for Matcher

Figure 7:
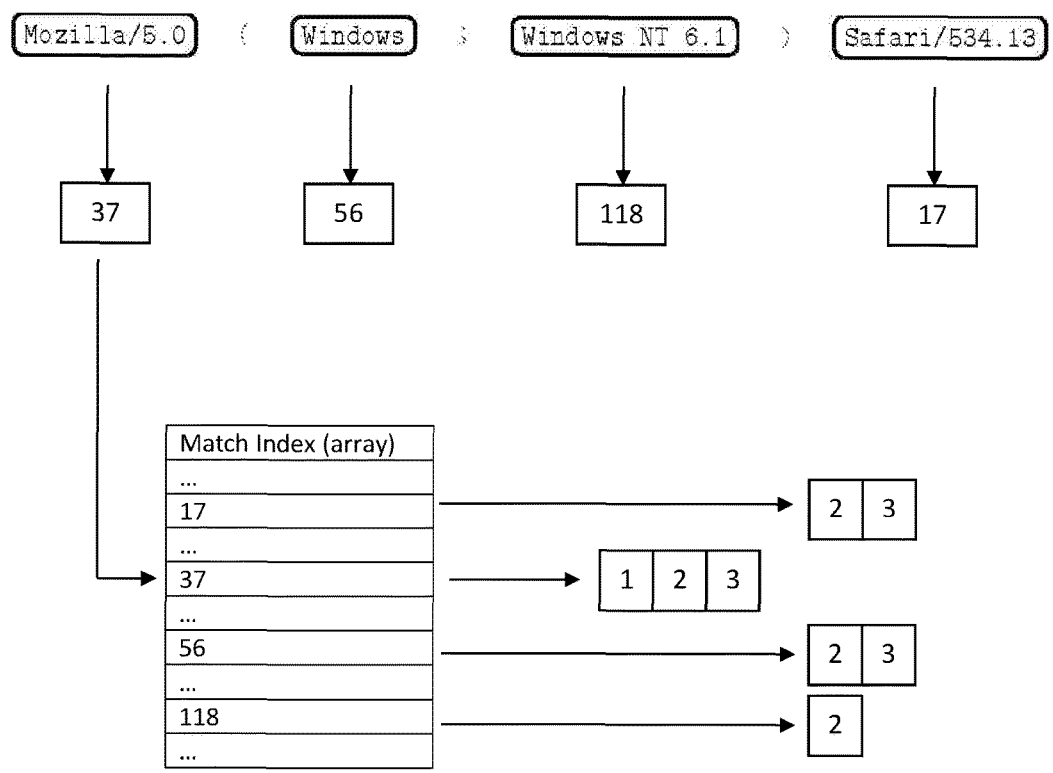
FIG. 7 is a schematic diagram illustrating one embodiment of a process for mapping user-agent tokens to a device identifier(s)

With reference to FIG. 7, an example of match index operation is now described in more detail. The match index operates to return, for a given token, a set of client devices that are associated with that token and therefore should be credited with the weight of that token in the scoring algorithm described above. Preferably, internal data representations in the DC component are size_t's (unsigned integer types) or arrays of same. As shown in FIG. 7, a given user agent string from a client request is tokenized, and a given token (a string) is mapped to a key for a data structure stored on the server (preferably in memory). Here the key is represented by an integer. More particularly, in this example, the integer represents an offset into an array holding the client device IDs in which that token appears. This means that the lookup can be performed with a single memory indirection. Hence, as shown in the example of FIG. 7, the token "Mozilla/5.0" is represented by integer "37", which leads to an offset that stores device IDs 1, 2, and 3, since client devices 1, 2, 3 all contain that token in this example. The device IDs 1, 2, 3 are then credited with the token weight, as discussed in the previous section. Accordingly, each token may be scored or credited against the client devices as it is being interned by the system. Though representing the tokens as integers has performance advantages, they could be kept as strings and used that way within the system, if desired.

Looking up a given token to obtain its associated "offset integer" can be accomplished using any of a wide variety of techniques known to those skilled in the art, and preferably will depend on the design parameters at hand, as well as the universe of possible tokens. Example implementations for performing such lookups include hash tables, tries (examples including a Patricia tree, nedtries and Judy arrays), cmptrees, policy-based trees, and other associative arrays.

Section 3.3—Characteristics Database

The characteristics database maps the client device IDs returned from the Matcher to the characteristics data that was configured for that client device. Virtually any set of characteristics may be configured. This enables the maintainer of the characteristics database to customize which characteristics are available to the server without changes to either the DC component or the server. Providers of the kinds of data that can be used to populate at least some of the data in the characteristics database include WURFL (wireless universal resource file, a device description repository) and Device Atlas.

Section 4.0—Configuration Files

Configuration input to DC is preferably implemented in the form of a lexicon file, an index file and a database file. The DC library uses these to construct its match index and characteristics database. To support dynamic reconfiguration (described below) as well as to ensure that servers with the same DC configuration give the same answers, the lexicon file is provided to synchronize the tokens and client device IDs that appear in the match index and database files.

The lexicon file consists of a lexicon ID, a list of tokens, and a list of client devices. Match indices and characteristics databases are constructed with a lexicon; they will throw an error/exception if their own configurations do not refer to the ID of the lexicon with which they were made.

Section 5.0—Reconfiguration

It is preferable to have the ability to reconfigure deployed DC functionality in a given server online. With respect to a given lexicon, a match index or characteristics database may be reloaded at any time. When new client devices or tokens are to be added to the system, a new lexicon is constructed.

Section 6.0—Reporting and Logging

A server with the DC component can use the pre-specified buckets characteristic (described above) to group counts of page views, requests, and bytes transferred. This enables the gathering of statistics on any arbitrary set of client devices via changes in configuration.

For more sophisticated data mining, the server can insert a unique device name (e.g., the device_name characteristic described above in the Data Model section, or other identifier) into its log lines. Those logs can then be processed with the characteristics database available to provide additional information about the client devices identified on the lines.

Section 7.0—"Direct Match" Embodiment

In an alternative embodiment, a 'direct matching' approach may be employed instead of the scoring of client device IDs to identify a "winning" client device that was described above.

Figure 8:
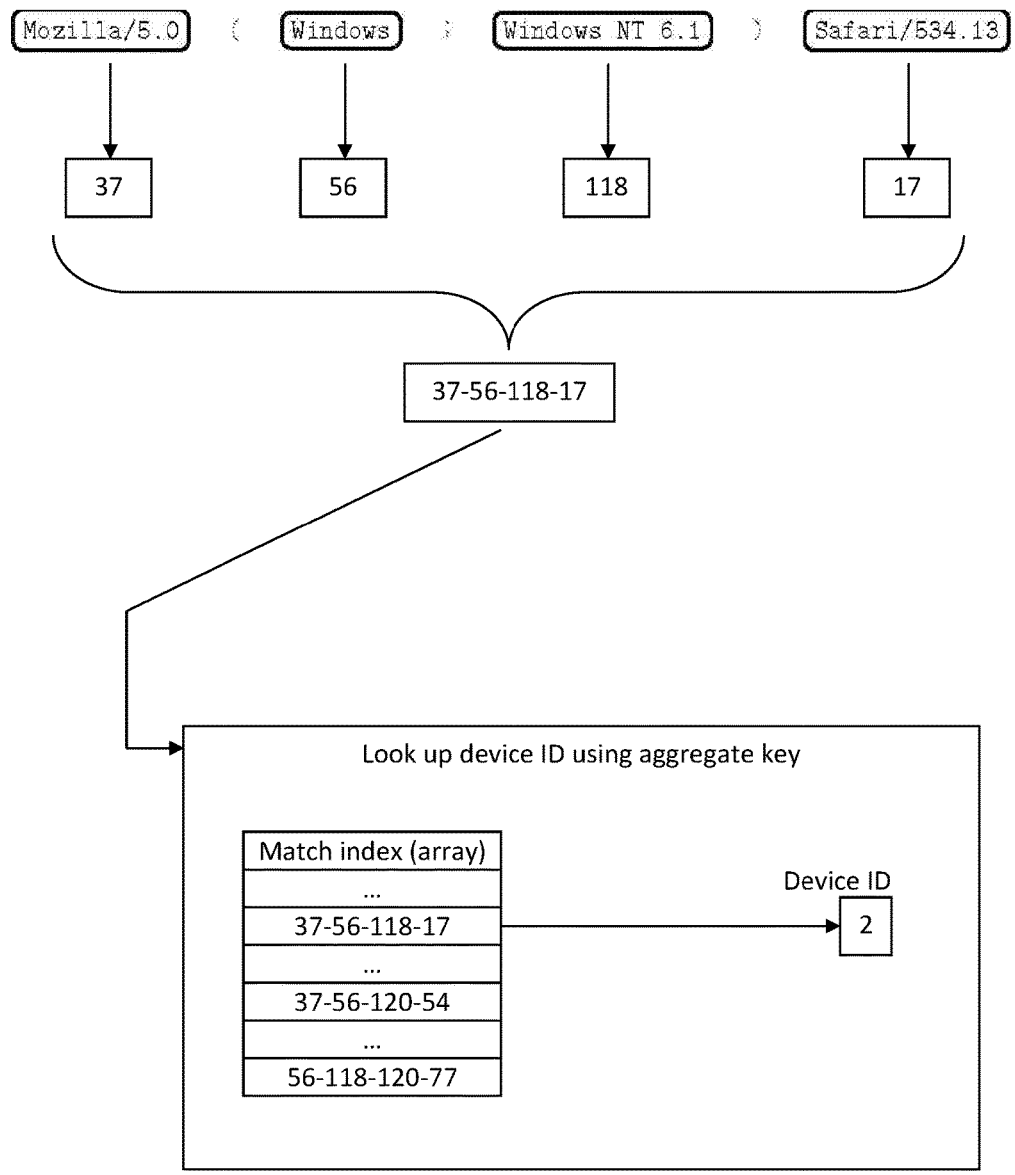
FIG. 8 is a schematic diagram illustrating one embodiment of a process for mapping user-agent tokens to a device identifier.

For direct matching, a user-agent string received in a request at the server is tokenized into one or more tokens, which are each associated with an integer, much as previously described with respect to FIG. 7. Rather than using these individually as keys, as in FIG. 7, they are used together to construct a key (e.g., by concatenating or mathematically combining them into one integer, or concatenating the individual token identifiers into one aggregate string, depending on how the tokens are being represented in the system, etc.). The lookup is performed in the match index using that key to obtain a single client device ID—that of the matching device. FIG. 8 illustrates the process. The client device ID can then be used to obtain the device characteristics, as discussed previously. Thus the matching process may be reduced to a single lookup in the match index, in some cases.

In the current embodiment, the key essentially points to an offset in a data structure such as the array of FIG. 7, except that that the resulting location in the array will contain only one client device ID. Thus the set of matching tokens represents, conceptually, a "fingerprint" that identifies the given client device. Put another way, the "winning" client device for a given set of token-integers has been determined offline as part of the configuration, and that client device ID has been stored in the array location.

While all of the tokens in the user-agent can be used to create the key (as shown in FIG. 8), in many cases it is preferable to ignore certain tokens that are not recognized, that are low-value, or for other reasons. For example, some tokens may be very frequent in the user-agent universe and thus less probative or essentially irrelevant for identifying a client device. Such tokens can be considered "noise" tokens (and ultimately do nothing but slow the process because, among other things, including them would require a larger lexicon of tokens and a larger match index). Also, some tokens—while they may serve to distinguish between certain devices—may nevertheless distinguish too finely and thus represent "noise". In other words, sometimes small differences between certain devices may ultimately be considered moot or irrelevant in terms of the way the client device will be treated by a server. An example might be a software build or version number that is deemed to have little significance to the process of content optimization and/or content delivery—the same content would be delivered to either of such client devices. Thus, tokens representing information that will be ignored by a server in generating a response to the client device might be ignored.

Figure 9:
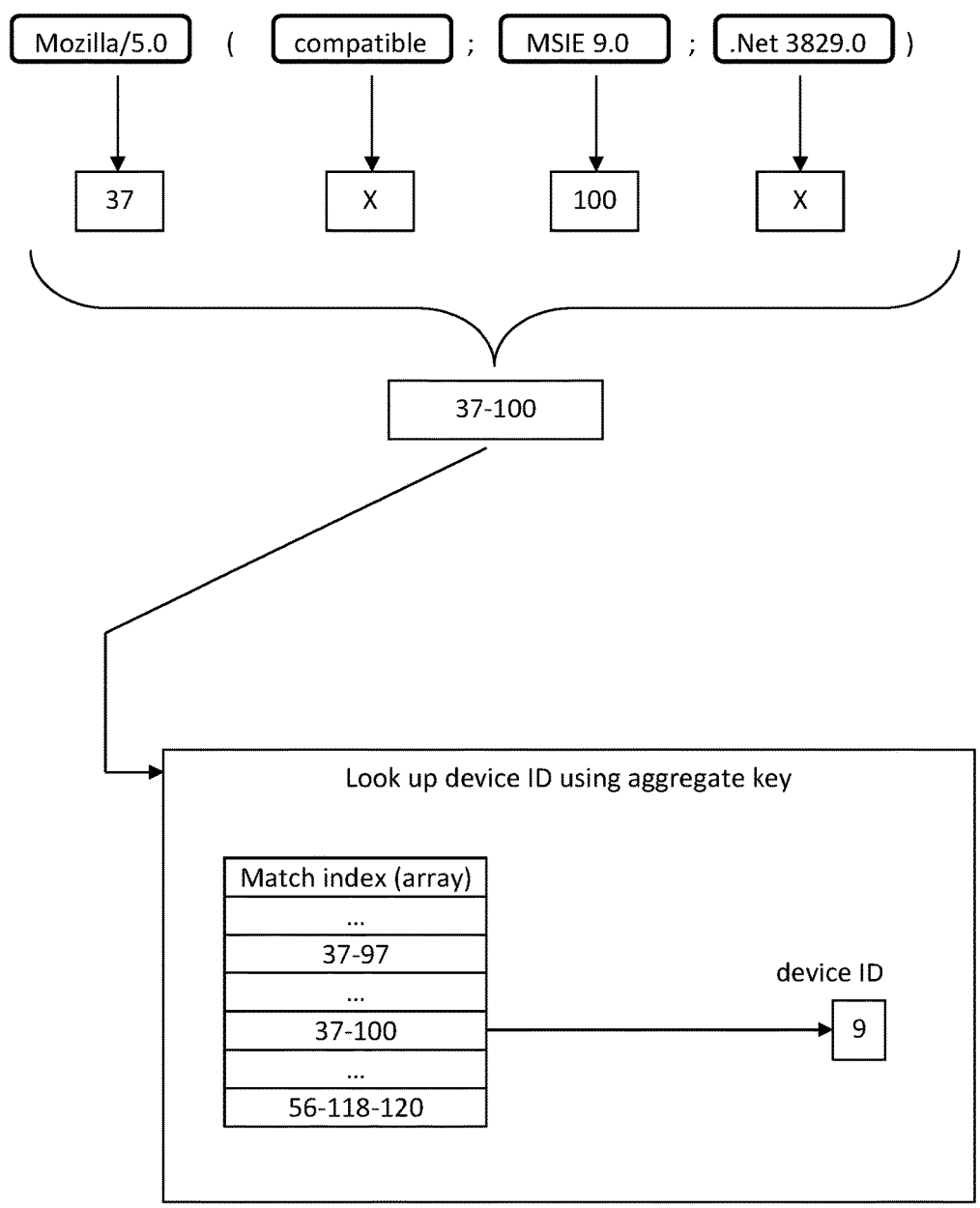
FIG. 9 is a schematic diagram illustrating an alternate embodiment of a process for mapping user-agent tokens to a device identifier, in which certain tokens are ignored.

In light of the above, in one embodiment, noise tokens can be identified and removed from the system as part of the configuration process. For example, when the offline tokenizing process is performed on sample user agents it yields a set of tokens (a whitelist) that is used to construct the lexicon file and the match index. The noise tokens are removed or otherwise kept out of the set of tokens, and therefore the lexicon file and the match index. As a result these noise tokens are not used in looking up a client device in the match index—if they appear at runtime in the user-agent from a client device, they are ignored. FIG. 9 illustrates the effect, at runtime, of removing noise tokens. Assume for illustrative purposes the system receives the user-agent string in FIG. 9 and that "compatible" and ".Net 3829.0" were omitted from the token whitelist during configuration. At runtime, those tokens are not recognized as valid tokens (this is indicated by the 'X'). The resulting key is made up of the token identifiers from the valid tokens, "Mozilla/5.0" and "MSIE9.0." This key can be used to look up the device identifier.

It should be noted that, in alternative implementations, the noise tokens could be part of a blacklist that is used to discard tokens at runtime, rather than the whitelist implementation described above.

It is also possible to configure the system to utilize "distinguished" or "high-value" tokens, and to use these to help identify client devices. For example, assume that when tokenized, a given user agent produces tokens A, B, C, D, E. Assume further that a set of distinguished tokens (within the larger set of valid user-agent tokens) has been identified, and that tokens B, C, D are such tokens. Tokens B and C, for example might designate a particular operating system, while token D represents a particular browser. The system can be configured to construct a key out solely of these tokens at runtime. For example, the key may be constructed as follows: operating_system_token+browser_token. Continuing the example, the resulting key is B (selected as the first OS token to appear)+D. This new key B+D can be used to look up a matching device in the match index. (Other categories of tokens beyond operating system and browser tokens might be defined in practice.)

Figure 10:
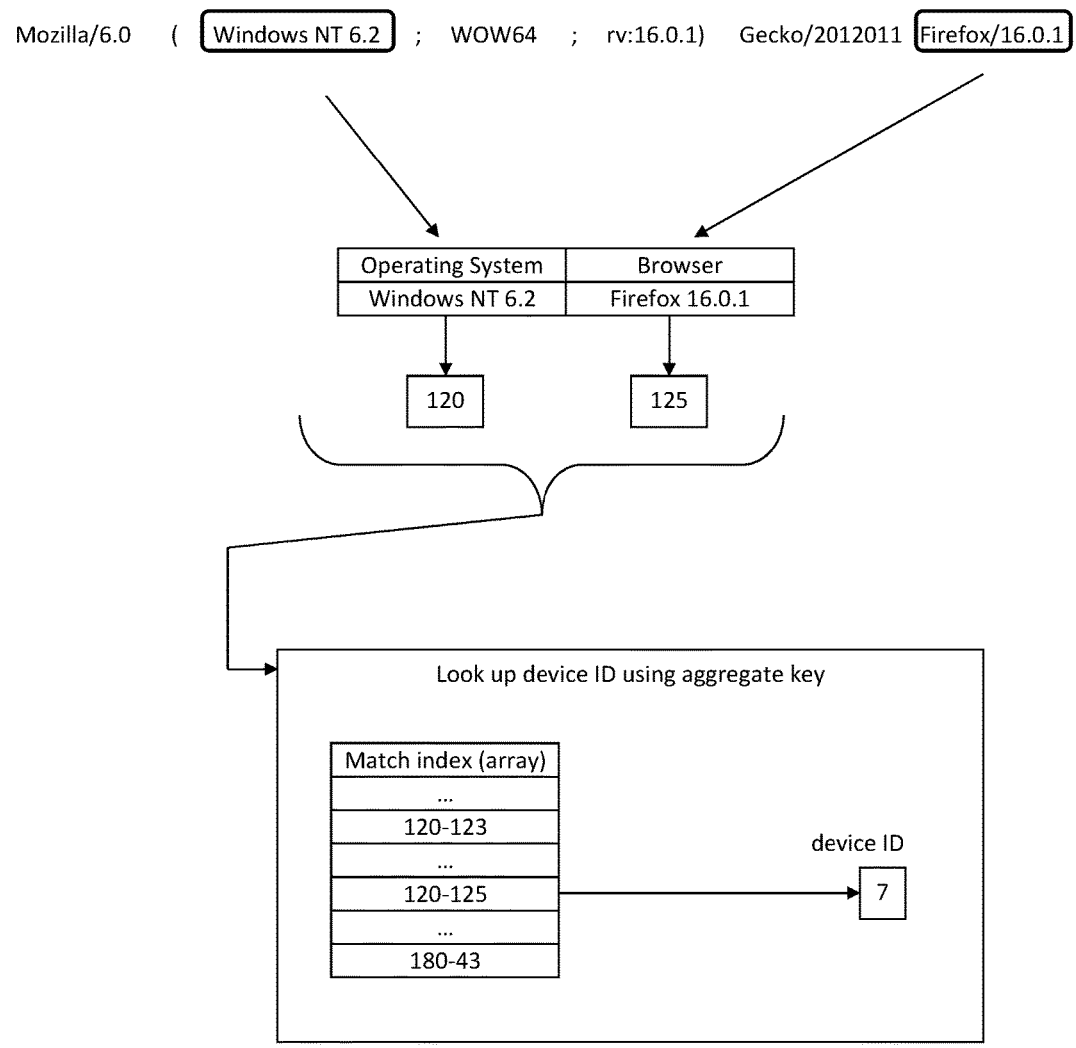
FIG. 10 is a schematic diagram illustrating an alternate embodiment of a process for mapping user-agent tokens to a device identifier, in which certain high-value tokens are used to construct an alternate key.

In one implementation, the use of the distinguished token lookup on distinguished tokens can be performed if the normal token matching process does not yield a matching device. FIG. 10 illustrates the distinguished token case.

Section 8.0—Computer Based Implementation

The clients, servers, and other devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more processors to provide a special purpose machine. The code may be executed using conventional apparatus—such as a processor in a computer, digital data processing device, or other computing apparatus—as modified by the teachings hereof. In one embodiment, such software may be implemented in a programming language that runs in conjunction with a proxy on a standard hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 11:
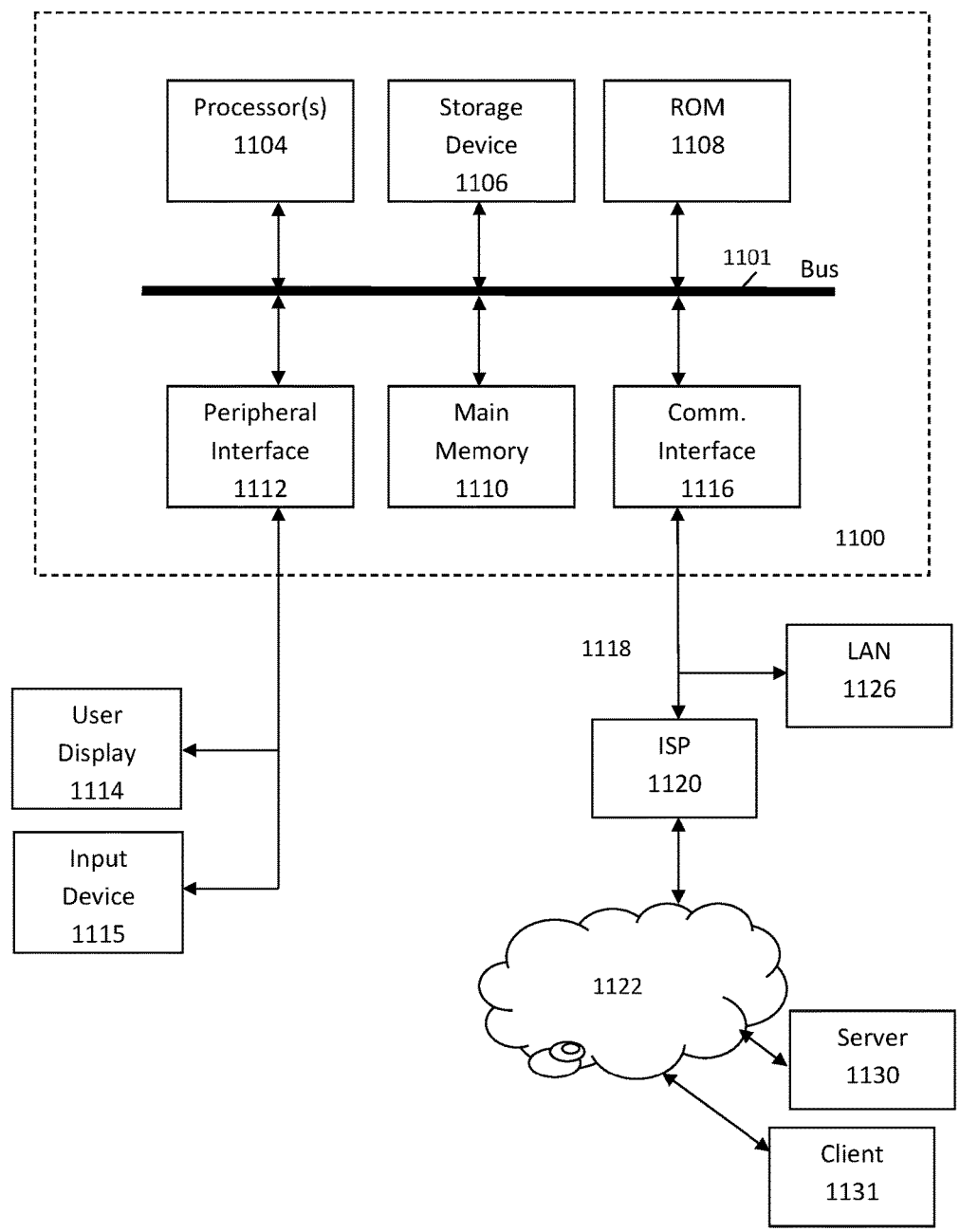
FIG. 11 is a block diagram illustrating hardware in a computer system that may be used to implement the teachings hereof.

FIG. 11 is a block diagram that illustrates hardware in a computer system 1100 upon which such software may run in order to implement embodiments of the invention. The computer system 1100 may be embodied in a client device, server, personal computer, workstation, tablet computer, wireless device, mobile device, network device, router, hub, gateway, or other device. Representative machines on which the subject matter herein is provided may be Intel-based computers running a Linux or Linux-variant operating system and one or more applications to carry out the described functionality.

Computer system 1100 includes a processor 1104 coupled to bus 1101. In some systems, multiple processor and/or processor cores may be employed. Computer system 1100 further includes a main memory 1110, such as a random access memory (RAM) or other storage device, coupled to the bus 1101 for storing information and instructions to be executed by processor 1104. A read only memory (ROM) 1108 is coupled to the bus 1101 for storing information and instructions for processor 1104. A non-volatile storage device 1106, such as a magnetic disk, solid state memory (e.g., flash memory), or optical disk, is provided and coupled to bus 1101 for storing information and instructions. Other application-specific integrated circuits (ASICs), field programmable gate arrays (FPGAs) or circuitry may be included in the computer system 1100 to perform functions described herein.

Although the computer system 1100 is often managed remotely via a communication interface 1116, for local administration purposes the system 1100 may have a peripheral interface 1112 communicatively couples computer system 1100 to a user display 1114 that displays the output of software executing on the computer system, and an input device 1115 (e.g., a keyboard, mouse, trackpad, touchscreen) that communicates user input and instructions to the computer system 1100. The peripheral interface 1112 may include interface circuitry, control and/or level-shifting logic for local buses such as RS-485, Universal Serial Bus (USB), IEEE 1394, or other communication links.

Computer system 1100 is coupled to a communication interface 1116 that provides a link (e.g., at a physical layer, data link layer, or otherwise) between the system bus 1101 and an external communication link. The communication interface 1116 provides a network link 1118. The communication interface 1116 may represent a Ethernet or other network interface card (NIC), a wireless interface, modem, an optical interface, or other kind of input/output interface.

Network link 1118 provides data communication through one or more networks to other devices. Such devices include other computer systems that are part of a local area network (LAN) 1126. Furthermore, the network link 1118 provides a link, via an internet service provider (ISP) 1120, to the Internet 1122. In turn, the Internet 1122 may provide a link to other computing systems such as a remote server 1130 and/or a remote client 1131. Network link 1118 and such networks may transmit data using packet-switched, circuit-switched, or other data-transmission approaches.

In operation, the computer system 1100 may implement the functionality described herein as a result of the processor executing code. Such code may be read from or stored on a non-transitory computer-readable medium, such as memory 1110, ROM 1108, or storage device 1106. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 1118 (e.g., following storage in an interface buffer, local memory, or other circuitry).

Any trademarks appearing herein (including Windows, Mozilla, Macintosh, Intel, Safari, iPhone, Blackberry, Android) are the properties of their respective owners and are used for identification and descriptive purposes in explaining the subject matter hereof, and not to imply endorsement or affiliation.

The invention claimed is:

1. A method operable in one or more computers for determining information about a requesting client device, the one or more computers comprising circuitry forming one or more processors and a memory storing instructions to be executed by the one or more processors to perform the method, the method comprising:
   at a first computer of the one or more computers, performing an offline configuration process comprising:
      creating an index that associates each of a plurality of tokens with one or more known client devices, and creating a lexicon file of tokens used in the index, wherein the index and the lexicon file are established prior to a request for content from a client device;
      send the index and the lexicon file to a second computer of the one or more computers to be stored in the second computer;
   at the second computer:
      receiving the request for content from a client device, the request including information about the client device;
      generating one or more tokens from the information in the request, based on the lexicon file;
      identifying the client device as a particular one of the one or more known client devices, based on a comparison of the one or more tokens generated from the information in the request and the index;
      wherein the identification step comprises:

(i) scoring the one or more known client devices, said scoring comprising: matching a particular token from the information in the request to a token associated with a known client device in the index, wherein the occurrence of said match increases the score of the associated known client device;

(ii) identifying the client device as the highest-scoring known client device relative to others of the one or more known client devices.

2. The method of claim 1, wherein for step (i) the particular token from the information in the request is associated with a weight based on its frequency amongst the one or more known client devices, the weight affecting the amount that the score of the associated known client device is increased upon the occurrence of said match.

3. The method of claim 1, wherein the plurality of tokens in the index and the one or more tokens generated from the information in the request each represent portions of user-agent strings.

4. The method of claim 1, wherein the information in the request comprises information in a user-agent header field.

5. The method of claim 1, wherein the request comprises an HTTP request.

6. The method of claim 1, wherein the client device is a mobile device.

7. The method of claim 1, wherein the second computer comprises an HTTP proxy server.

8. A system, comprising:

a first computer that has circuitry forming one or more processors and memory storing instructions to be executed by the one or more processors, the first computer operative upon execution of the instructions to perform an offline configuration process that comprises: create an index that associates each of a plurality of tokens with one or more known client devices, and create a lexicon file of tokens used in the index, wherein the index and the lexicon file are established prior to a request for content from a client device;

send the index and the lexicon file to a second computer;

the second computer having circuitry forming one or more processors and memory storing instructions to be executed by the one or more processors, the second computer operative upon execution of the instructions to:

receive the request for content from a client device, the request including information about the client device;

(ii) generate one or more tokens from the information in the request, based on the lexicon file;

(iii) identify the client device as a particular one of the one or more known client devices, based on a comparison of the one or more tokens generated from the information in the request and the index;

wherein the second computer identifies the client device as a particular one of the one or more known client devices by:

(a) scoring the one or more known client devices, said scoring comprising matching a particular token from the information in the request to a token associated with a known client device in the index, wherein the occurrence of said match increases the score of the associated known client device;

(b) identifying the client device as the highest-scoring known client device relative to others of the one or more known client devices.

9. The system of claim 8, wherein in part (a), the particular token from the information in the request is associated with a weight based on its frequency amongst the one or more known client devices, the weight affecting the amount that the score of the associated known client device is increased by the second computer upon the occurrence of said match.

10. The system of claim 8, wherein the plurality of tokens in the index and the one or more tokens generated from the information in the request each represent portions of user-agent strings.

11. The system of claim 8, wherein the plurality of tokens in the index include any of: browser name, operating system name, processor name.

12. The system of claim 8, wherein the information in the request comprises information in a user-agent header field.

13. The system of claim 8, wherein the request comprises an HTTP request.

14. The system of claim 8, wherein the client device is a mobile device.

15. The system of claim 8, wherein the second computer comprises an HTTP proxy server.

* * * * *